United States Patent
Rammal

(10) Patent No.: US 6,226,991 B1
(45) Date of Patent: May 8, 2001

(54) THERMALLY SENSITIVE ACTUATING DEVICE

(75) Inventor: Muhammad I. Rammal, Bay City, MI (US)

(73) Assignee: Globe Technologies Corporation, Standish, MI (US)

( * ) Notice: Subject to any disclaimer, the term of this patent is extended or adjusted under 35 U.S.C. 154(b) by 0 days.

(21) Appl. No.: 09/374,933

(22) Filed: Aug. 16, 1999

(51) Int. Cl.$^7$ .................................................. F01B 29/10
(52) U.S. Cl. .................................................. 60/527
(58) Field of Search ..................... 60/527, 528, 529, 60/530

(56) References Cited

U.S. PATENT DOCUMENTS

| | | | |
|---|---|---|---|
| 3,625,002 | * 12/1971 | Davis | 60/528 |
| 4,346,554 | 8/1982 | Glinecke . | |
| 4,911,400 | * 3/1990 | Gruber | 60/528 X |
| 5,396,770 | * 3/1995 | Petot et al. | 60/528 X |
| 5,822,989 | * 10/1998 | Sturdevant et al. | 60/528 |

* cited by examiner

*Primary Examiner*—Hoang Nguyen
(74) *Attorney, Agent, or Firm*—Reising, Ethington, Barnes, Kisselle, Learman & McCulloch, P.C.

(57) ABSTRACT

A thermally sensitive actuating assembly comprises a base having an opening therein through which a force transmitting member extends. The force transmitting member has therein an opening in which a collapsible strut is accommodated, the strut reacting with the force transmitting member and the member through which it extends to disable movement of the two members in one direction of relative movement. Until such time as the strut collapses it is maintained under a biasing force which stabilizes its position relative to the other parts of the assembly.

13 Claims, 2 Drawing Sheets

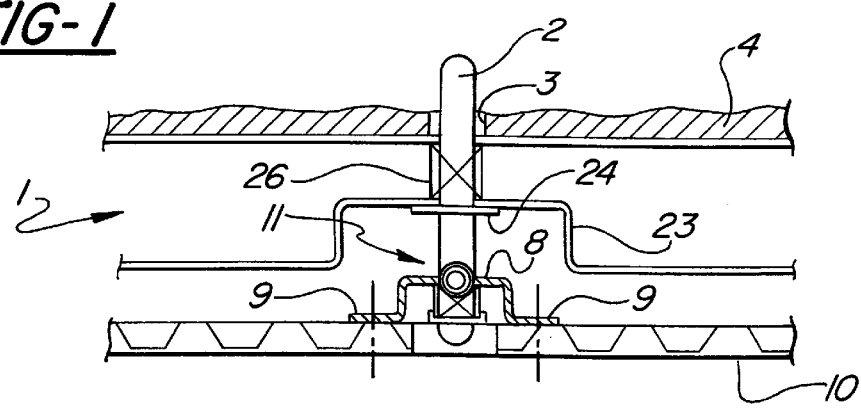
FIG-1
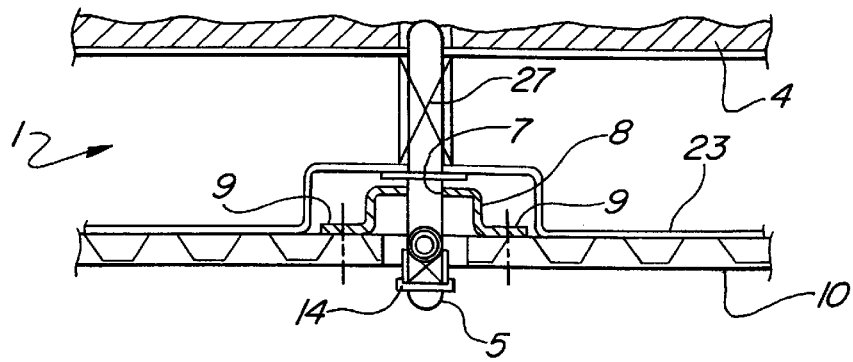
FIG-2
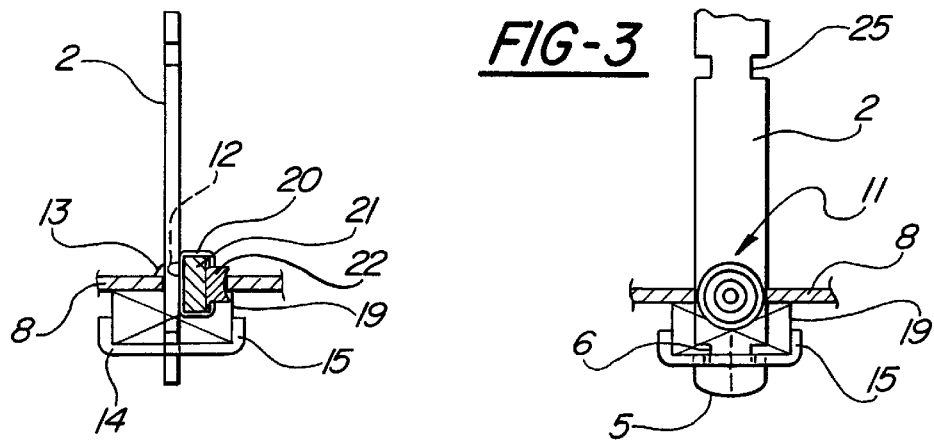
FIG-3
FIG-4
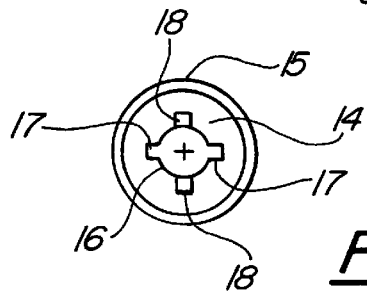
FIG-5

THERMALLY SENSITIVE ACTUATING DEVICE

This invention relates to a thermally sensitive actuating device of the kind which is responsive to a predetermined increase in ambient temperature to effect movement or actuation of a normally stationary, but movable, component, such as a damper, for controlling the delivery of combustion air to a burner.

BACKGROUND OF THE INVENTION

There are many instances in which it is both desirable and necessary to move a normally stationary, but movable, component of equipment from one position to another quickly in response to a predetermined increase in ambient temperature. For example, it is common to provide a burner assembly operable to apply heat to an object and to control the flow of combustion air or fuel to the burner by means of a movable damper or valve. It is desirable to provide an actuating mechanism which responds automatically and responds to a predetermined rise in ambient temperature for moving such damper or valve automatically from an open position to a closed position so as to terminate the delivery of combustion air to the burner. Various proposals heretofore have been made for the purposes referred to above. One example is disclosed in the U.S. Pat. No. 4,346,554. Apparatus constructed in accordance with the invention performs the same function as that disclosed in such patent, but is an improvement over the patented construction.

SUMMARY OF THE INVENTION

A thermally sensitive actuating mechanism constructed in accordance with the invention has a reciprocal actuating member which is coupled to a component, such as a valve or damper, to effect movement of the component from a normal position to an adjusted position in response to a predetermined increase in ambient is temperature. A spring biases the component to the adjusted position, and the biasing force of the spring normally is overcome by a collapsible strut which cooperates with an abutment on the actuating member to disable movement of the component from the normal position to the adjusted position except when the ambient temperature reaches the predetermined level.

The thermally sensitive strut includes a eutectic material which remains solid until its temperature is raised to a predetermined level at which time the material liquefies. The strut has a stable height as long as the eutectic material remains solid, but once such material liquefies the strut collapses or shortens, thereby enabling movement of the component from the normal position to the adjusted position.

In the preferred embodiments the strut in its normal condition is subjected to a biasing force which not only assists in assembling its several parts in condition for operation, but also assists in expelling the liquefied eutectic material, thereby accelerating collapse of the strut.

THE DRAWINGS

Apparatus constructed an accordance with presently preferred embodiments of the invention is illustrated in the accompanying drawings, wherein:

FIG. 1 is an fragmentary, partly sectional and partly elevational view of one embodiment of a thermally sensitive actuating device and illustrating the device in its normal condition;

FIG. 2 is a view similar to FIG. 1, but illustrating the thermally sensitive device and the component controlled thereby in the positions they occupy following collapse of the strut;

FIG. 3 is a fragmentary, partly elevational, and partly sectional view of a portion of the apparatus shown in FIGS. 1 and 2;

FIG. 4 is a side elevational view of the apparatus shown in FIG. 3;

FIG. 5 is a plan view of a retainer forming a part of the device;

THE PREFERRED EMBODIMENTS

Figure 6:
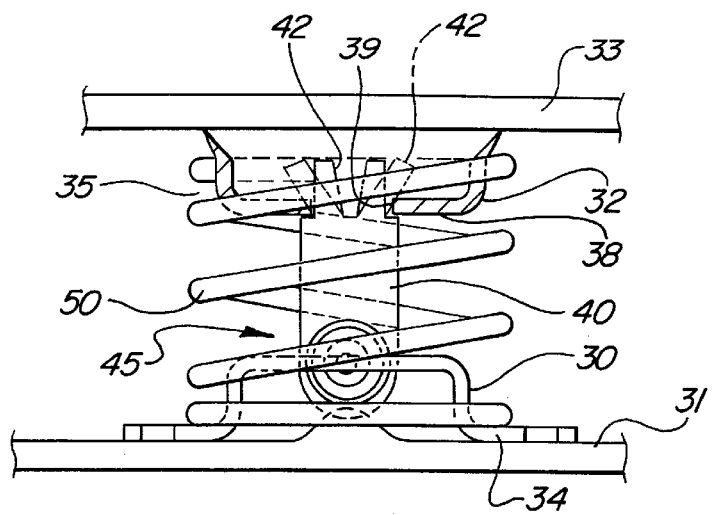
FIG. 6 is a fragmentary, partly sectional and partly elevational view of a second embodiment of the invention.

A thermally sensitive actuating device according to one embodiment of the invention is designated generally by the reference character, in FIGS. 1–5 and comprises an elongate thrust number 2 slideably accommodated in a slot 3 formed in a base 4 and terminating at one end in a crossbar 5. Adjacent the crossbar is a notch 6 which forms a neck and shoulders.

The thrust number 2 extends through a slot 7 formed in a generally U-shaped mounting bracket 8 having mounting ears 9 at opposite ends for attachment by screws or the like to a fixed permeable member 10. The opening 7 in the bracket 8 conforms exactly to the opening 8 shown in FIG. 4 of U.S. Pat. No. 4,346,554 so that the opening 7 may accommodate not only the thrust member 2, but also a collapsible strut 11 which corresponds exactly to the strut 3 shown in the same patent. The thrust member 2 has a groove or indentation 12 on that side of the member 2 which confronts the strut 11 and a laterally extending projection or abutment 13 on the opposite side.

At that end of the member 2 adjacent the crossbar 5 is a retainer or cap 14 having a peripheral flange 15 and a central opening 16 the diameter of which is slightly greater than the width of the neck 6 of the member 2. Extending laterally from the opening 16 is a pair of extension slots 17 the combined length of which is greater than the width of the member 2, thereby enabling the crossbar 5 to pass through the slots 17. At 90 degrees from the slots 17 are recesses 18 which enable the shoulders adjacent the crossbar 5 to be rotated to a position in which they are removably latched in the recesses 18 and prevent relative movement of the parts 2 and 14 in one direction.

A biasing compression spring 19 has one end seated upon the retainer 14 and its opposite end seated upon the bracket 8. The spring 19 maintains a constant force on the member 2 urging it in a downward direction, as viewed in the drawings, and such downward movement is disabled by the engagement of the projection 13 with the bracket 8 adjacent the opening 7. The projection 13 is maintained in engagement with the bracket 8 by the strut 11 which, as is best shown in FIG. 4, has a cup 20 within which is a wafer 21 formed of eutectic material and a post 22 having a dished outer end in which a projection (not shown) of the bracket 8 is accommodated as is shown in the above identified patent. The overall height of the strut 11, as long as the wafer 21 is in solid form, is sufficient to cause the member 2 to be so positioned that the projection 13 overlies and bears upon the bracket 8. When the wafer 21 liquefies, however, the strut collapses, thereby enabling movement of the strut downwardly by as viewed in the drawings.

The thrust member 2 extends through an opening in an operating member 23, such as a damper, and the member 23 is maintained in a fixed position longitudinally of the member 2 by a washer 24 which is accommodated in notches 25 formed in the member 2. An operating compression spring 26 reacts between the base 4 and the operating member 23 and constantly urges the latter toward the member 10. As long as the wafer 21 of the strut 11 is solid, however, the engagement of the projection 13 with the bracket 8 prevents such movement of the members 2 and 23. When the strut 11 collapses the spring 19 exerts a force on the retainer 14 and on the member 2 via the crossbar 5 urging the member 2 downwardly as viewed in the drawing. The force of the spring 19 is augmented by the spring 26 which acts directly on the member 23 to drive it rapidly and forcefully toward the member 10.

Since the retainer 14 is rockable about the shoulders defining the crossbar 5 the force exerted by the spring 19 on the retainer 14 will rock the retainer in a direction to cause the member 2 to move into the space provided by the collapse of the strut 11, thereby disengaging the projection 13 from the bracket 8. This action can be ensured by forming that surface of the projection 13 which engages the bracket 8 with a slight incline which will function to cam the member 2 inwardly of the opening in which the strut is accommodated.

The embodiment disclosed in FIGS. 6–10 comprises a base 30 adapted to be secured by screws or the like to a movable member 31 similar to the member 23 and a second or retainer member 32 adapted to be secured to a base 33 similar to the base 4. The member 30 has an annular rim 34 and the member 32 has a similar rim 35. The rim 34 encircles a web 36 having therein an opening 37 formed like the opening 7 formed in the bracket 8. The rim 32 encircles a web 38 having therein a slot 39. A flat thrust member 40 has at one end thereof shoulders 41 beyond which a pair of limbs 42 extend. The limbs 42 pass through the opening 39 so that the web 38 seats on the shoulders 41. The limbs 42 then may be deformed, i.e., moved apart, as is shown in dotted lines in FIGS. 6 and 10, thereby securing the member 40 to the retainer member 32.

The thrust member 40 has in one side thereof a recess 43 and at the opposite side a wedge-like projection 44. The member 40 is of such size as freely to pass through the opening 37 adjacent one side of the latter, as is shown in FIG. 7.

A thermally sensitive, collapsible strut 45 corresponding in all respects to the strut 11 is accommodated in the opening 37. The strut 45 has a flat-bottomed cup 46 which seats on the thrust member 40 and within which is a wafer 42 formed of eutectic material. Seated upon the wafer 42 and projecting beyond the cup 46 is a post 47 having, like the post 22, a recess 48 for the accommodation of a projection 49 of the web 36 which extends inwardly of the opening 37.

A compression spring 50 is seated at one end on the member 30 and at its other end on the member 32 and normally exerts a force on the members 31 and 33 in such direction as to bias the member 31 in a direction away from the member 32.

Figure 7:
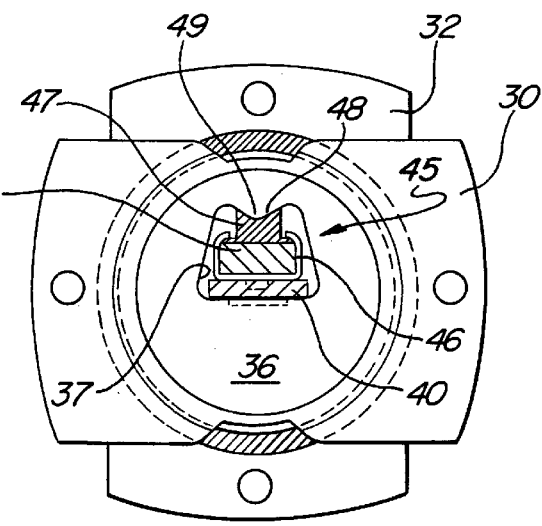
FIG. 7 is a transverse sectional view of the apparatus shown in FIG. 6.
Figure 8:
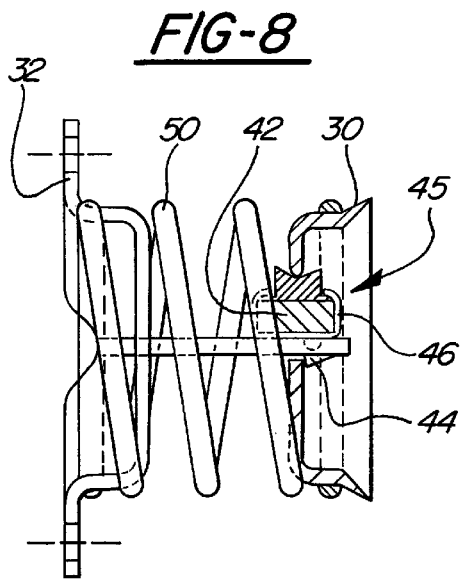
FIG. 8 is a partly side elevational and partly sectional view of the apparatus shown on FIGS. 6 and 7.
Figure 9:
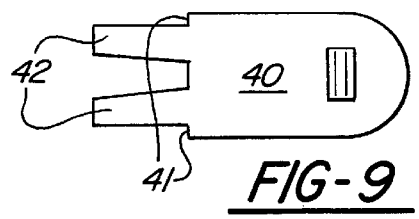
FIG. 9 is a plan view of a part of the apparatus.
Figure 10:
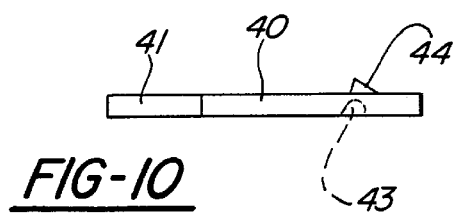
FIG. 10 is a side elevational view of the part shown in FIG. 9.

As long as the eutectic wafer 42 of the collapsible strut 45 remains solid, the force of the spring 50 is overcome by the engagement between the projection 44 of the thrust member 40 with the web 36 adjacent the opening 37, as is best shown in FIGS. 7 and 8. When the wafer liquefies, however, the strut will shorten and the projection 44 will cam the thrust member 40 in such direction as to enable the spring 50 to move the members 31 and 33 away from one another. If the member 31 is a damper, such movement will cause the damper to close. In each of the two disclosed embodiments the collapsible strut is maintained under spring tension until such time as the eutectic material liquefies. The spring tension provides a stable positioning of the relatively movable members with which the device is associated and assists in accelerating relative movement of such members when the eutectic material liquefies and the strut collapses.

The disclosed embodiments are representative of presently preferred forms of the invention, but are intended to be illustrative rather than definitive thereof. The invention is defined in the claims.

I claim:

1. A thermally sensitive actuating device comprising a first member having an opening therein; a thrust member slideably extending through said opening; a retainer carried by said thrust member and normally spaced from said first member; biasing means reacting between said retainer and said first member and normally biasing said thrust member to move in one direction relative to said first member; thermally sensitive strut means accommodated in said opening and bearing at one of its ends on said thrust member and at its opposite end on said first member; and abutment means on said first member in engagement with said strut means for disabling movement of said thrust member in said one direction, said strut means normally having a height sufficient to span that portion of said opening between said first member and said thrust member and react with said abutment means to restrain movement of said thrust member in said one direction, said strut means being collapsible in response to a predetermined increase in ambient temperature thereby enabling said biasing means to initiate movement of said thrust member in said one direction past said abutment means.

2. The device according to claim 1 wherein said biasing means includes a spring bearing at one of its ends on said first member and at its opposite end on said retainer.

3. The device according to claim 1 wherein said retainer has a slot therein through which a portion of said thrust member extends, said retainer and said thrust member including releasable latch means for restricting movement of said retainer in a direction opposite to said one direction.

4. The device according to claim 1 wherein said latch means comprises a crossbar carried by said thrust member and a slot in said retainer, said crossbar being operable to pass through said slot in one relative position of said retainer and said thrust member, said thrust member being rotatable relative to said cap following passage of said crossbar through said slot to a latched position in which said crossbar cannot pass through such slot.

5. The device according to claim 4 wherein said retainer has at least one depression therein in which said crossbar is accommodated when said crossbar is in said latched position.

6. The device according to claim 3 wherein said latch means comprises at least one extension carried by said thrust member which extends through said slot, said extension being deformed in a direction to overlie said retainer when said thrust member is in said latched position.

7. The device according to claim 1 wherein said biasing means comprises a compression spring.

8. A thermally sensitive actuating device comprising a base member having an opening therein; a thrust member extending through said opening; a retainer carried by said thrust member adjacent one end thereof; biasing means reacting between said retainer and said base member at one side thereof and yieldably urging said thrust member to move in one direction relative to said base member; abutment means carried by said thrust member in a position adjacent that side of said base member which is opposite said one side; and collapsible thermally sensitive strut means occupying said opening and bearing on said thrust member at a position between said abutment means and said base member, said strut means being in a position adjacent that side of said base member which is opposite said one side, said strut means normally disabling movement of said thrust member in said one direction, said strut means being collapsible in response to a predetermined temperature increase thereby enabling said biasing means to move said thrust member in said one direction.

9. The device according to claim 8 wherein said collapsible strut means normally is accommodated in said opening and has one of its ends seated on said thrust member and its opposite end separably connected to said base member at a point adjacent said opening.

10. The device according to claim 9 wherein said strut means has an uncollapsed height greater than the distance from said abutment means to said point.

11. The device according to claim 8 wherein said retainer has a slot therein for the accommodation of said one end of said thrust member, said thrust member having adjacent said one end a neck occupying such slot and forming a shoulder adjacent said one end of said thrust member, said neck enabling relative rotation of said retainer and said thrust member between a first position in which said one end of said thrust member is movable through said slot and a second position in which said shoulder overlies said retainer and disables movement of said thrust member in said one direction relative to said retainer.

12. The device according to claim 8 wherein said retainer has a slot therein for the accommodation of said one end of said thrust member, said one end of said thrust member having a limb bent in a direction to overlie said retainer and disable movement of said thrust member in said one direction relative to said retainer, said thrust member having a shoulder adjacent said one end of said thrust member and bearing upon said retainer for disabling movement of said thrust member relative to said retainer in a direction opposite said one direction.

13. The device according to claim 12 wherein said thrust member has a pair of said limbs both of which are bent to overlie said retainer.

* * * * *